United States Patent [19]

Kloster

[11] Patent Number: 4,599,021
[45] Date of Patent: Jul. 8, 1986

[54] RETAINING NUT FOR MACPHERSON STRUT SUSPENSION ASSEMBLY

[76] Inventor: Kenneth D. Kloster, 6649 Millridge, Maumee, Ohio 43537

[21] Appl. No.: 475,893

[22] Filed: Mar. 16, 1983

[51] Int. Cl.⁴ .............................................. B23B 51/00
[52] U.S. Cl. ................................... 408/221; 280/666; 280/696; 411/437
[58] Field of Search ................ 408/221; 411/436, 437, 411/414, 417, 418, 427, 303, 428; 280/696, 666

[56] References Cited

U.S. PATENT DOCUMENTS

| | | | |
|---|---|---|---|
| 2,005,672 | 6/1935 | Chaffee | 411/414 |
| 2,896,495 | 7/1959 | Crawford | 411/437 |
| 3,355,192 | 11/1967 | Kloesel, Jr. et al. | 411/414 X |
| 3,501,995 | 3/1970 | Lanns, Jr. | 411/437 |
| 4,108,469 | 8/1978 | Schwarzbich | 280/696 X |
| 4,170,373 | 10/1979 | Beck et al. | 280/696 X |
| 4,256,421 | 3/1981 | Kloster | 408/221 |

OTHER PUBLICATIONS

Machinery's Handbook, 19th Edition, pp. 1331-1332.

*Primary Examiner*—Gil Weidenfeld
*Assistant Examiner*—Glenn L. Webb

[57] ABSTRACT

This invention relates to an improved self-threading unit which can be utilized to hold a replacement shock absorber within the cylindrical shroud of a vehicular suspension system commonly referred to as a MacPherson strut suspension assembly. The nut includes a generally cylindrical main body portion having a tapered thread forming portion on the inner wall thereof. The thread forming portion is adapted to roll form buttress-type threads on the upper end of the cylindrical shroud. The upper end of the main body portion includes a top wall having an annular bushing mounted therein for receiving the shock absorber piston rod and centering the nut as it is rotated onto the cylindrical shroud. The top wall is provided with channels extending radially outwardly from the bushing such that, in the event the shock absorber bottoms out, any liquid which may have accumulated on the top wall of the nut, will be evacuated outwardly and will not be forced into the shroud through the bushing.

1 Claim, 8 Drawing Figures

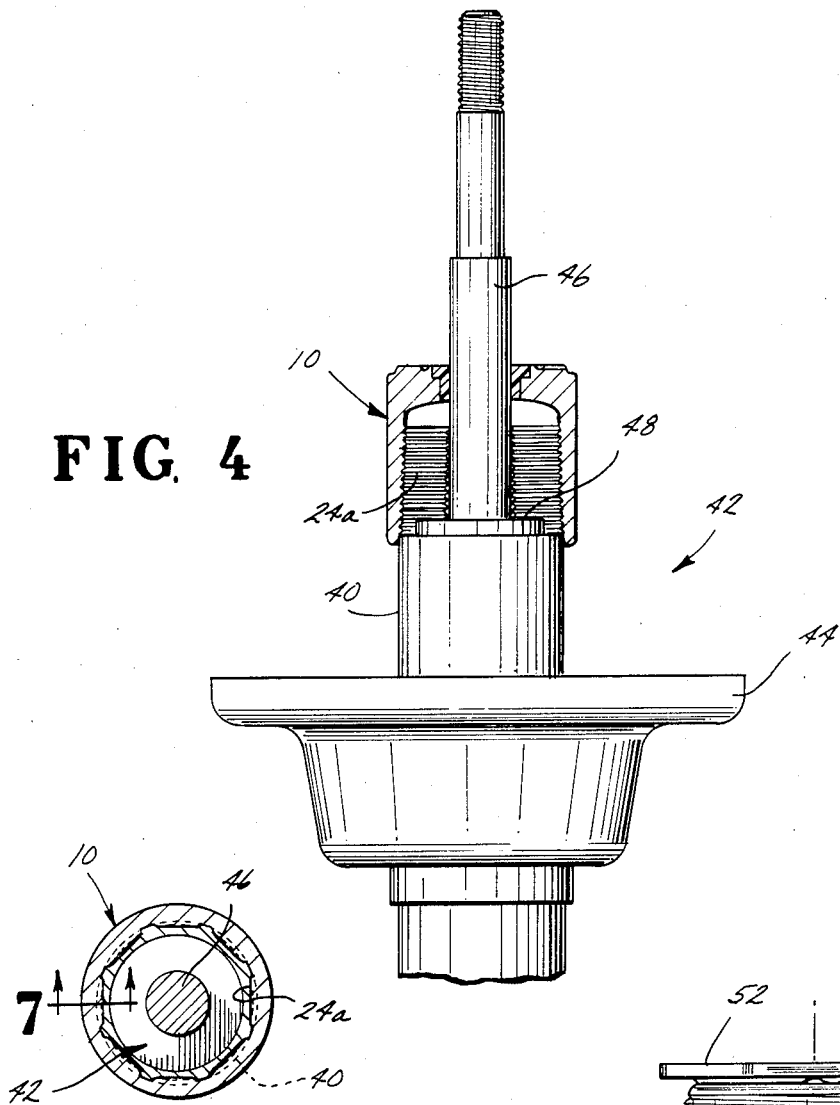
FIG. 4
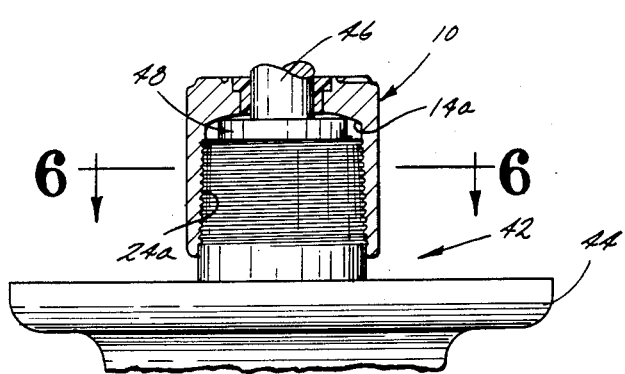
FIG. 6
FIG. 5
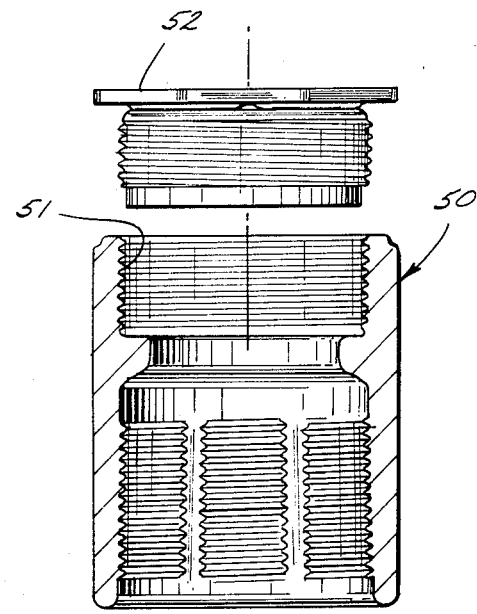
FIG. 8

RETAINING NUT FOR MACPHERSON STRUT SUSPENSION ASSEMBLY

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact component of a vehicle suspension system. The MacPherson strut suspension system is disclosed in more detail in U.S. Pat. No. 2,624,592 to E. S. MacPherson.

One of the problems associated with MacPherson strut assemblies is related to the replacement of a worn shock absorber unit. One solution to this problem is to manufacture the MacPherson strut assembly with a construction which permits the shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber unit is inserted into an associated cylindrical shroud which is subsequently sealed by welding or roll forming. The cylindrical shroud typically includes a lower coil spring support platform and a lower support bracket. Thus, when the shock absorber unit wears out, the vehicle owner is faced with the expense of replacing the entire cylindrical shroud assembly, including the coil spring support platform and the lower support bracket.

One solution to the problem of rebuilding a factory sealed cylindrical shroud assembly has been proposed in U.S. Pat. No. 4,256,421 to Kenneth D. Kloster. The Kloster patent discloses a self-threading nut which can be utilized to hold a replacement shock absorber unit within the cylindrical shroud of a MacPherson strut suspension system. If the original shock absorber of the MacPherson strut is factory sealed within the cylindrical shroud, the upper end of the cylindrical shroud must first be severed to provide access to the original shock absorber. After the upper end of the cylindrical shroud is severed, the worn shock absorber can be removed and replaced with a new shock absorber. The self-threading nut disclosed in the Kloster patent can then be used as a permanent retainer to hold the replacement shock absorber in the cylindrical shroud.

SUMMARY OF THE INVENTION

The present invention relates to an improved self-threading nut which can be utilized to hold a replacement shock absorber within the cylindrical shroud of a MacPherson strut suspension system. The self-threading nut includes a generally cylindrical main body including a hollow portion having thread forming means on the inner annular wall thereof. The thread forming means terminates in an annular skirt portion for receiving the upper end of the cylindrical shroud on which threads are to be formed. The upper end of the main body portion includes a top wall having an upper annular centering means mounted therein for receiving the piston rod of the shock absorber assembly.

One improvement to the self-threading nut includes channel means formed in the top wall of the main body and extending radially outwardly from the upper centering means. The channel means enables water or other liquid which may accumulate on the upper end of the nut to be evacuated outwardly such that, in the event the shock absorber bottoms out, the accumulated liquid will not be forced into the shroud through the upper centering means. Another improvement to the self-threading nut relates to means for roll forming buttress-type threads on the upper end of the cylindrical shroud. The roll forming means tapers inwardly to enable the self-threading nut to be securely fastened to cylindrical shrouds having an outer diameter which varies over a predetermined range.

BRIEF DESCRIPTION OF THE DRAWINGS

The above, as well as other features and advantages of the invention, will become readily apparent to one skilled in the art from reading the following detailed description of the invention when considered in light of the accompanying drawings in which:

FIG. 4 is a side sectional view showing the self-threading nut positioned on the upper end of a cylindrical shroud of a MacPherson strut suspension system;

FIG. 5 is a side view, similar to FIG. 4, but showing the self-threading nut fully threaded onto the cylindrical shroud of the MacPherson strut assembly;

FIG. 6 is a sectional view taken along line 6—6 of FIG. 5;

FIG. 8 is a sectional view of an alternate embodiment of a self-threading nut which is utilized in combination with a conventional threaded retaining nut.

DESCRIPTION OF THE PREFERRED EMBODIMENT

Figure 1:
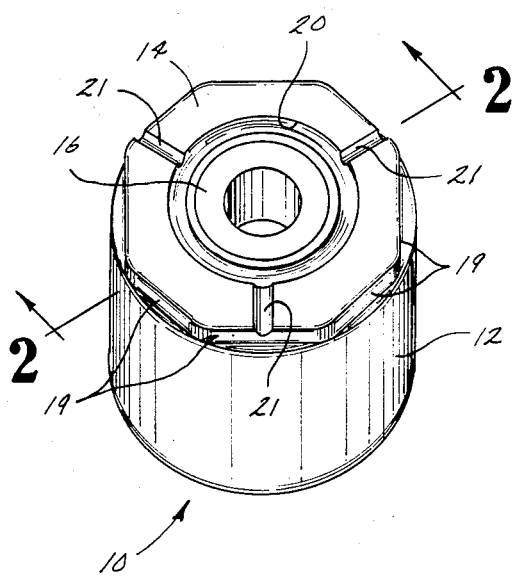
FIG. 1 is a perspective view of an improved self-threading nut embodying the features of the present invention.
Figure 2:
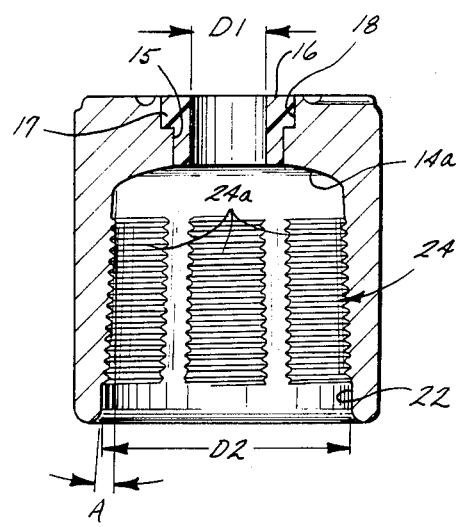
FIG. 2 is a sectional view taken along the line 2—2 of FIG. 1.
Figure 3:
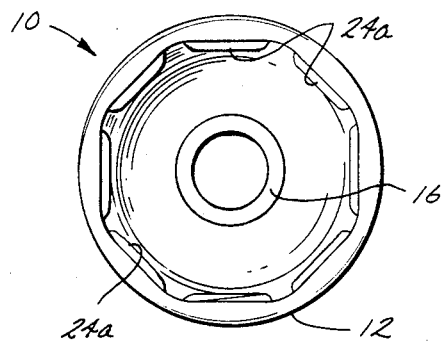
FIG. 3 is a bottom plan view of the self-threading nut of FIG. 2.

Referring to FIGS. 1 through 3, there is shown a self-threading nut 10 embodying the features of the present invention. The nut 10 is utilized to retain a replacement shock absorber unit within the cylindrical shroud of a MacPherson strut suspension system. As will be discussed, the nut 10 may be used as a permanent retainer or, alternatively, may be used as a tool for forming threads on the outer wall of the cylindrical shroud.

The self-threading nut 10 includes a generally cylindrical main body portion 12. A top wall 14 having a lower surface 14a is attached to the upper end of the main body portion 12. The top wall 14 has a centrally located aperture 15 formed therein for receiving an annular bushing 16. The bushing 16 is typically constructed of a plastic material, and has an outwardly extending lip 17 which is received within an increased diameter portion 18 formed at the upper end of the aperture 15. As shown in FIG. 2, the inner diameter of bushing 16 has a diameter D1. As will be discussed, the diameter D1 corresponds to the diameter of the piston rod which is inserted into the bushing 16.

The top wall 14 has a periphery formed of a plurality of straight portions 19 which cooperate to define a generally octagonal shape for receiving a cooperating socket tool (not shown) which can be utilized to rotate the nut after the nut has been positioned on top of the cylindrical shroud. The top wall 14 is also provided with an annular channel 20 which circumscribes the bushing 16. A plurality of spaced apart radially extending channels 21 extend from the annular channel 20 to the outer periphery of the top wall 16. The channels 20 and 21 enable water or other liquid which may have accumulated on the upper side of the top wall 14 to be evacuated outwardly through the channels 21 in the event the shock absorber bottoms out. The channels 20 and 21 greatly reduce the possibility that the accumulated liquid may be forced into the associated cylindrical shroud between the bushing 16 and the associated shock absorber piston rod.

Figure 7:
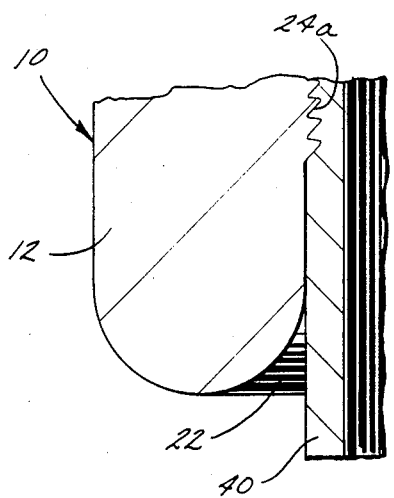
FIG. 7 is a sectional view taken along line 7—7 of FIG. 6.

The inner wall of the main body portion 12 has a lower annular skirt portion 22 formed therein having a diameter D2, as indicated in FIG. 2. As will be discussed, the diameter D2 corresponds to the outer diameter of the cylindrical shroud over which the nut 10 is to be threaded. The inner wall of the main body portion 12 has a thread forming means 24 which extends upwardly along the inner wall and is tapered inwardly to form an angle A with respect to a vertical reference line. The thread forming means 24 consists of a plurality of circumferentially spaced apart thread forming sections 24a which function to produce threads on the outer wall of the associated cylindrical shroud by the roll forming process. As shown in FIG. 7, the thread forming means 24 is adapted to form buttress type threads on the associated cylindrical shroud.

FIGS. 4 and 5 illustrate the operation of the self-threading nut 10 as it is placed on a cylindrical shroud 40 of a MacPherson strut assembly 42 and then rotated onto the cylindrical shroud. The MacPherson strut assembly 42 shown in FIGS. 4 and 5 has been partially disassembled by removing a coil spring (not shown) which was supported by a lower coil spring support platform 44 welded to the cylindrical shroud 40. A tool which can be utilized to remove the coil spring is disclosed in U.S. Pat. No. 4,034,960 to K. D. Kloster. A piston rod 46 of a replacement shock absorber unit 48 extends axially from the top of the cylindrical shroud 40.

Before the replacement shock absorber can be placed within the cylindrical shroud 40, the original worn shock absorber must be removed therefrom. In instances where the original shock absorber has been factory-sealed within the cylindrical shroud by welding or roll forming, the upper end of the cylindrical shroud must be severed to provide access to the original shock absorber. After the upper end of the cylindrical shroud is severed, the worn shock absorber can be removed and replaced with a new shock absorber.

After the replacement shock absorber unit is inserted within the cylindrical shroud 40, the self-threading nut 10 is placed on the top of the cylindrical shroud, as shown in FIG. 4. As previously mentioned, the diameter D1 of the piston rod 46 is substantially equal to the inner diameter of the bushing 16, while the outer diameter D2 of the cylindrical shroud 40 is substantially equal to the inner diameter of the lower annular skirt portion 22. The relatively close fit between the piston rod 46 and the bushing 16 function as a centering means for ensuring that the threads are properly formed on the cylindrical shroud when the nut is rotated. Similarly, the relatively close fit between the cylindrical shroud 40 and the lower annular skirt portion 22 cooperate to center the nut 10 as it is rotated onto the cylindrical shroud 40 and thereby produce the desired alignment between the nut 10 and the associated piston rod of the shock absorber unit. As the nut 10 is rotated, the thread forming sections 24 cooperate to roll form threads having a buttress-type configuration, as shown in FIG. 7. The buttress thread arrangement functions to provide increased holding force as compared to conventional threads in retaining the nut on the cylindrical shroud.

When the nut is fully threaded onto the cylindrical shroud 40, as shown in FIG. 5, the top edge of the replacement shock absorber unit 48 abuts the lower surface 14a of the top wall 14. Generally, the outside diameter of the MacPherson cylindrical shrouds will be substantially equal to one another. However, in some instances, the outside diameters may vary from one shroud to another over a predetermined range. Thus, the diameter of the threads formed by the nut 10 is typically selected such that the nut will be securely fastened to a shroud having the smallest expected diameter. Consequently, the tapered threaded portion 24 causes cylindrical shrouds having a slightly larger diameter to be slightly compressed during the thread forming operation.

As previously mentioned, the nut 10 may be used as a permanent retainer or, may be used as a tool for forming threads on the outer wall of the cylindrical shroud. If the nut 10 is used as a thread forming tool, the nut is removed after the threads have been formed. A conventional retaining nut (not shown) having internally formed threads can then be connected to the newly formed threaded portion of the cylindrical shroud.

There is shown in FIG. 8 an alternate embodiment of the self-threading nut of the present invention. In FIG. 8, the alternate embodiment 50 is substantially similar to the self-threading nut 10 of FIG. 1, except that the upper end of the nut 50 is provided with an internally threaded portion 51 which is adapted to receive a conventional threaded retaining nut 52. When the embodiment shown in FIG. 8 is used, access to the replacement shock absorber unit can be gained by simply removing the retaining nut 52.

In accordance with the provisions of the patent statutes, the principle and mode of operation of the invention have been explained in what is considered to represent its preferred embodiment. It should, however, be understood that the invention may be practiced otherwise than as specifically illustrated and described without departing from its spirit or scope.

What is claimed is:

1. An apparatus for retaining a shock absorber unit within a cylindrical shroud of a shock absorber assembly wherein the shock absorber unit includes a piston rod axially extending from the upper end of the cylindrical shroud, said apparatus comprising:

a one piece main body including a hollow cylindrical portion provided with means for threadedly attaching said main body to the upper end of the cylindrical shroud, said main body further including an integral top wall located at the upper end of said hollow portion, said top wall having a centrally located piston rod aperture formed therein for receiving the piston rod of the shock absorber unit; and channel means formed in said top wall, said channel means including an upwardly facing annular channel substantially circumscribing the piston rod aperture and at least one upwardly facing radial channel extending generally outwardly from said annular channel to the periphery of said top wall for removing liquid which accumulates on the upper surface of said top wall.

* * * * *